US012732905B2

(12) United States Patent
Li et al.

(10) Patent No.: US 12,732,905 B2
(45) **Date of Patent: *Sep. 8, 2026**

(54) SYSTEMS AND METHODS FOR AUTOMATIC APPLICATION-LEVEL NETWORK SLICING OVER PRIVATE CELLULAR NETWORKS

(71) Applicant: Verizon Patent and Licensing Inc., Basking Ridge, NJ (US)

(72) Inventors: Feng Li, Lexington, MA (US); Nandan Naik, Salem, MA (US); Mark Shostak, Plano, TX (US); Zoltan Janos Dudar, Roswell, GA (US); Sheryl Zita Zuzarth, Springfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/938,954

(22) Filed: Nov. 6, 2024

(65) Prior Publication Data

US 2025/0063489 A1 Feb. 20, 2025

Related U.S. Application Data

(63) Continuation of application No. 17/721,588, filed on Apr. 15, 2022, now Pat. No. 12,170,954.

(51) Int. Cl.

| | |
|---|---|
| ***G06F 15/16*** | (2006.01) |
| ***H04L 12/46*** | (2006.01) |
| ***H04L 41/0894*** | (2022.01) |
| ***H04L 41/40*** | (2022.01) |
| ***H04L 47/2441*** | (2022.01) |
| ***H04W 28/10*** | (2009.01) |
| ***H04W 48/18*** | (2009.01) |
| *H04W 40/24* | (2009.01) |

(52) U.S. Cl.

CPC ......... *H04W 48/18* (2013.01); *H04L 12/4641* (2013.01); *H04L 41/0894* (2022.05); *H04L 41/40* (2022.05); *H04L 47/2441* (2013.01); *H04W 28/10* (2013.01); *H04W 40/24* (2013.01)

(58) Field of Classification Search

CPC ............. H04L 12/4641; H04L 47/2441; H04L 41/0894; H04L 41/40; H04W 28/10; H04W 40/24; H04W 48/18

USPC .......................................................... 709/200

See application file for complete search history.

(56) References Cited

U.S. PATENT DOCUMENTS

| | | | | |
|---|---|---|---|---|
| 10,320,705 | B1 | 6/2019 | Li et al. | |
| 10,356,838 | B2 * | 7/2019 | Salkintzis | H04W 48/18 |
| 10,623,257 | B1 * | 4/2020 | Marquardt | H04L 41/0846 |
| 10,904,942 | B2 | 1/2021 | Salkintzis | |
| 11,290,910 | B2 * | 3/2022 | Sanaullah | H04B 17/327 |
| 11,368,230 | B2 | 6/2022 | Tetsuka | |
| 11,395,127 | B2 | 7/2022 | Sahin et al. | |

(Continued)

*Primary Examiner* — Moustafa M Meky

(57) ABSTRACT

A device may include a processor configured to detect that a communication session in a private cellular wireless network is associated with an application and determine that data units associated with the communication session match a network slicing rule associated with the private cellular wireless network. The processor may be further configured to classify the communication session to a network slice based on the network slicing rule and assign the data units associated with the communication session to the network slice.

20 Claims, 8 Drawing Sheets

(56) References Cited

U.S. PATENT DOCUMENTS 11,399,310 B1 * 7/2022 Malhotra ............. H04W 28/06
11,582,653 B2 * 2/2023 Cai ....................... H04W 48/18
11,606,834 B2 3/2023 Salkintzis
11,608,834 B2 3/2023 Ishii
11,665,632 B2 5/2023 Prabhakar
11,683,672 B2 * 6/2023 Paczkowski .......... H04M 15/61 455/406
11,877,349 B2 * 1/2024 Cai ....................... H04W 8/205
11,974,164 B2 * 4/2024 Malhotra ................ H04W 4/20
11,991,563 B2 5/2024 Cai
12,009,973 B2 6/2024 Lee
12,022,430 B2 6/2024 Nord
12,127,106 B2 * 10/2024 Ninglekhu ............ H04W 40/02
12,170,954 B2 * 12/2024 Li ......................... H04W 48/18
12,200,614 B2 * 1/2025 Parikh ................... H04W 12/03
12,267,680 B2 * 4/2025 Paczkowski ............ H04L 67/51
12,279,340 B2 * 4/2025 Cai ....................... H04W 76/15
12,289,797 B2 * 4/2025 Matolia ................. H04W 36/06
12,395,889 B2 * 8/2025 Marupaduga ......... H04W 28/06
2017/0245316 A1 8/2017 Salkintzis
2018/0249530 A1 8/2018 Salkintzis
2019/0053147 A1 2/2019 Qiao et al.
2019/0342937 A1 11/2019 Salkintzis
2021/0153287 A1 5/2021 Salkintzis
2021/0243639 A1 * 8/2021 Sanaullah ............ H04B 17/327
2022/0124043 A1 4/2022 Zhu
2022/0124560 A1 4/2022 Yeh et al.
2022/0232435 A1 * 7/2022 Cai ....................... H04W 48/18
2022/0248296 A1 8/2022 Merwaday
2022/0264365 A1 * 8/2022 Malhotra ................ H04W 4/20
2022/0272620 A1 * 8/2022 Ninglekhu ............ H04W 40/02
2022/0417729 A1 * 12/2022 Cai ....................... H04W 36/13
2023/0092324 A1 3/2023 Seidel
2023/0134319 A1 * 5/2023 Paczkowski ............ H04W 4/50 455/406
2023/0171653 A1 * 6/2023 Cai ....................... H04W 48/18 370/329
2023/0269655 A1 * 8/2023 Parikh ................... H04W 12/03 455/411
2023/0276304 A1 * 8/2023 Malhotra ................ H04W 4/20 370/328
2023/0308855 A1 * 9/2023 Matolia ................. H04W 8/183
2024/0137748 A1 * 4/2024 Cai ....................... H04W 8/205
2024/0147578 A1 * 5/2024 Paczkowski ............ H04W 4/50
2025/0133486 A1 * 4/2025 Parikh ................... H04W 12/37
2025/0220410 A1 * 7/2025 Matolia ................... H04W 4/50
2025/0227456 A1 * 7/2025 Cai ..................... H04W 36/324

* cited by examiner

SYSTEMS AND METHODS FOR AUTOMATIC APPLICATION-LEVEL NETWORK SLICING OVER PRIVATE CELLULAR NETWORKS

PRIORITY INFORMATION

This patent application is a continuation of U.S. patent application Ser. No. 17/721,588, filed on Apr. 15, 2022, and titled "SYSTEMS AND METHODS FOR AUTOMATIC APPLICATION-LEVEL NETWORK SLICING OVER PRIVATE CELLULAR NETWORKS," the content of which is hereby incorporated herein by reference in its entirety.

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. A private enterprise may operate a wireless access network that manages a large number of user devices using different types of services. Managing different types of services poses various challenges.

DETAILED DESCRIPTION OF EMBODIMENTS

Figure 1:
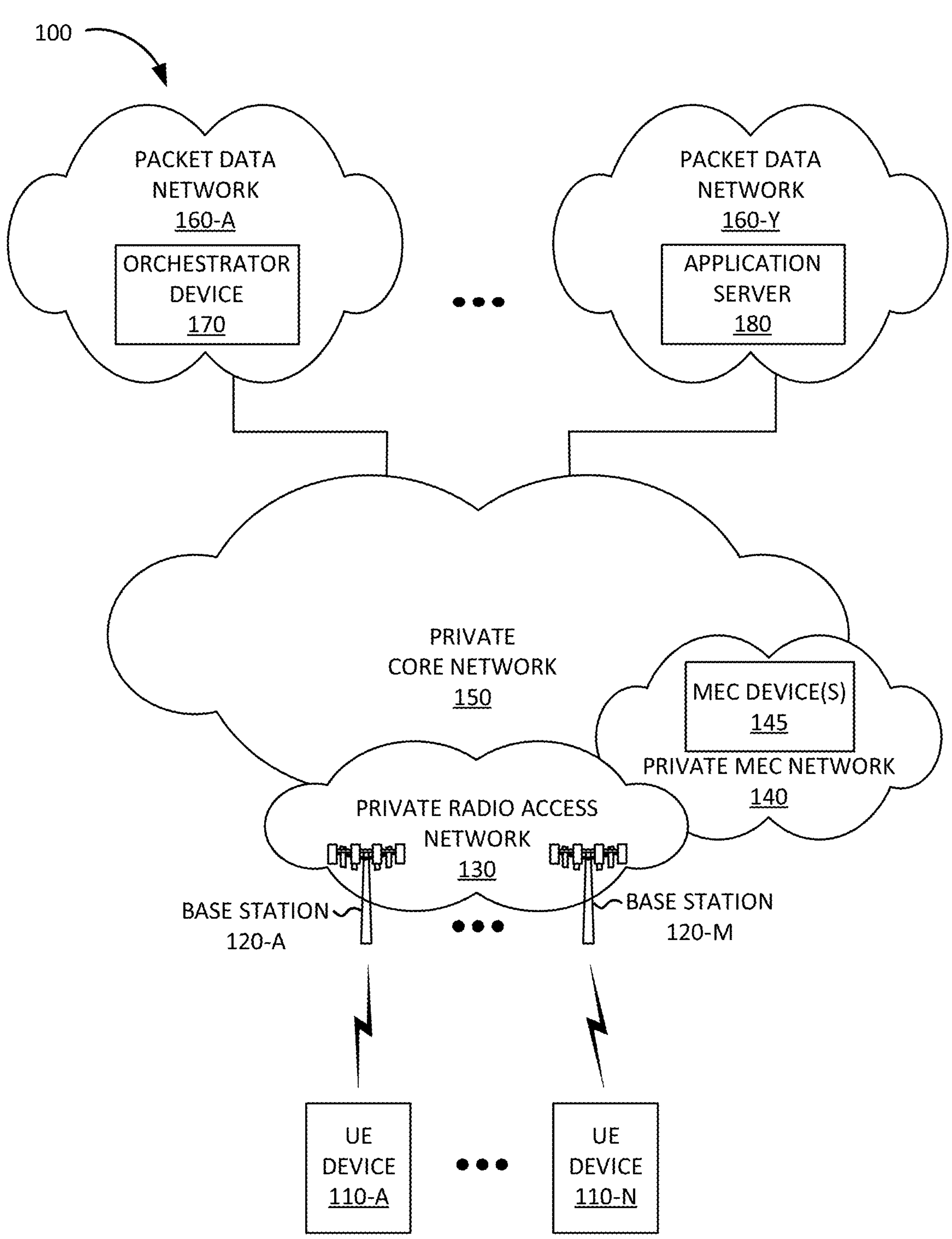
FIG. 1 illustrates an environment according to an implementation described herein.

The following detailed description refers to the accompanying drawings. The same reference numbers in different drawings identify the same or similar elements.

An important feature of next generation cellular wireless network, such as, for example, Fifth Generation (5G) networks, is network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, configured to implement a different set of requirements and/or priorities, and/or may be associated with a particular Class of Service (CoS) (e.g., Quality of Service (QOS) class, etc.), type of service, and/or particular enterprise customer associated with a set of user equipment (UE) devices.

Examples of network slices that may be implemented in a 5G network may include a default network slice used for sessions not associated with other particular network slices; an enhanced Mobile Broadband (eMBB) network slice for Voice over Internet Protocol (VOIP) telephone calls and/or data sessions for accessing Internet websites; a massive Internet of Things (IoT) network slice for IoT devices; an Ultra-Reliable Low Latency Communication (URLLC) network slice for URLLC communication, such as medical monitoring devices, autonomous vehicles, industrial automation, etc.; and/or other types of network slices. For example, a Mobile Private Network (MPN) for a particular enterprise may be associated with an MPN network slice.

Furthermore, an enterprise may manage its own Radio Access Network (RAN) of base stations and/or a core network to manage the RAN and provide connectivity between the RAN and other networks. The enterprise may lease devices, network infrastructure, cloud center resources, and/or software components from a provider of communication services to implement a private RAN and/or a private core network for UE devices used by the employees and/or customers associated with the enterprise. An administrator may configure the private RAN and/or private core network for a set of network slices.

However, simply slicing a private cellular network may not guarantee an application-level Quality of Experience (QoE). Application-level network slicing may assign different application types to different network slices. Application-level network slicing may be implemented by mapping different applications into different Virtual Local Area Networks (VLAN) in a network. However, such an implementation may require, for example, manual mapping of QoS Class Identifier (QCI) on the RAN side to a VLAN identifier (ID) in the core network for each application and may require a system update each time the VLAN assignments in the network change. Furthermore, a user may intentionally misconfigure an application for a better QoE (e.g., configuring a video application as a mission critical application, etc.) to take advantage of a static mapping.

Implementations described herein relate to systems and methods for automatic application-level network slicing over private cellular networks. The systems and methods may include a rule engine that automatically detects an application associated with a communication session and assigns the communication session to a network slice based on a slicing rule associated with the application. A network device, such as a Fourth Generation (4G) eNodeB, a 4G Packet Data Network Gateway (PGW), a 5G gNodeB, a 5G Session Management Function, a 5G User Plane Function, and/or another type of network device in a RAN or core network, may be configured to receive, from an orchestration device, a network slicing rule that assigns a particular application to a particular network slice and stores the network slicing rule in a database associated with a traffic classifier. The network slicing rule may, for example, assign applications of different types to different network slices and/or assign different applications of the same type to different network slices.

The network device may be further configured to detect that a communication session in a private cellular wireless network is associated with an application, determine that data units associated with the communication session match the network slicing rule, classify the communication session to a network slice based on the network slicing rule, and assign the data units associated with the communication session to the network slice. A data unit may correspond to a segment, a packet, or a frame. Assigning the data units to the network slice may include assigning the data units to a particular CoS, assigning the data units to a logical network associated with the network device, transferring or routing the data units to a particular device in the private core network or another network associated with the private core network, and/or performing another type of action to assign the data units to the network slice. For example, in a 4G core network, network slicing may not be implemented and may be emulated by assigning a particular CoS, such as a QCI, to the communication session based on the detected application.

Detecting that the communication session in the private cellular wireless network is associated with the application may include detecting that data units associated with the communication session include a particular VLAN identifier, detecting that data units associated with the communication session are associated with a particular Internet Protocol (IP) address and port number, detecting that data units associated with the communication session include the device group identifier, and/or detecting that the communication session in the private cellular wireless network is associated with the application using another technique.

Additionally, or alternatively, detecting that a communication session in a private cellular wireless network is associated with an application may include determining that the data units associated with the communication session satisfy a data unit parameter criterion. For example, application data units may be encrypted and deep packet/frame inspection may not be able to determine an application ID by analyzing the content of a data unit payload. However, a data unit pattern may be used to determine that data units are associated with an application or to identify a particular application. The data unit parameter criterion may include, for example, a pattern of one uplink data unit to multiple downlink data units, a payload (which is associated with uplink data units) that is greater than an uplink payload threshold, a cumulative payload (which is associated with downlink data units) is greater than a downlink payload threshold, and/or another type of data unit parameter criterion indicative of data units associated with an application.

Furthermore, detecting that a communication session in a private cellular wireless network is associated with an application may include determining that the data units associated with the communication session correspond to video data units. Determining that the data units correspond to video data units may include determining that throughput associated with the data units is greater than a throughput threshold, determining that an average downlink payload associated with the data units is greater than a payload threshold, determining that a data unit count associated with the data units is greater than a data unit count threshold, and/or use another technique to detect video data units.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in private RAN 130, private MEC network 140 (which includes MEC devices 145), private core network 150, and packet data networks (PDNs) 160-A to 160-Y (referred to herein collectively as "PDNs 160" and individually as "PDN 160").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

Private RAN 130 may include base stations 120. Base station 120 may be configured for one or more Radio Access Technology (RAT) types. For example, base station 120 may include a 5G New Radio (NR) base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices 110 using a 5G NR air interface, a 4G LTE air interface, and/or using another type of cellular air interface. Base station 120 may enable UE device 110 to communicate with core network 150.

Private MEC network 140 may be associated with one or more base stations 120 and may provide MEC services for UE devices 110 attached to the base stations 120. Private MEC network 140 may be in proximity to base stations 120 from a geographic and network topology perspective, thus enabling low latency communication with UE devices 110 and/or base stations 120. As an example, private MEC network 140 may be located on the same site as base station 120. As another example, private MEC network 140 may be geographically closer to one of base stations 120 and reachable via fewer network hops and/or fewer switches, than other base stations 120.

Private MEC network 140 may include one or more MEC devices 145. MEC devices 145 may provide MEC services to UE devices 110. A MEC service may include, for example, a low-latency microservice associated with a particular application, such as, for example, a user authentication microservice, a navigation microservice, an online shopping microservice, a content delivery microservice, a gaming microservice, a virtual and/or augmented reality microservice, a health monitoring microservice, and/or another type of microservice associated with a low latency requirement. As another example, a MEC service may include a microservice associated with a virtualized network function (VNF) of private core network 150. As yet another example, a MEC service may include a cloud computing service, such as cache storage, use of artificial intelligence (AI) accelerators for machine learning computations, image processing, data compression, locally centralized gaming, use of Graphics Processing Units (GPUs) and/or other types of hardware accelerators for processing of graphics information and/or other types of parallel processing, and/or other types of cloud computing services.

Core network 150 may be managed by a provider of cellular wireless communication services and may manage communication sessions of subscribers connecting to private core network 150 via private RAN 130. For example, private core network 150 may establish an Internet Protocol (IP) connection between UE devices 110 and PDN 160. In some implementations, private core network 150 may include a 5G core network. Exemplary components of a 5G core network are described below with reference to FIG. 2. In other implementations, private core network 150 may include a 4G core network (e.g., an evolved packet core (EPC) network). Exemplary components of a 4G core network are described below with reference to FIG. 3.

The components of private core network 150 may be implemented as dedicated hardware components or as virtualized functions implemented on top of a common shared physical infrastructure using Software Defined Networking (SDN). For example, an SDN controller may implement one or more of the components of private core network 150 using an adapter implementing a VNF virtual machine, a Cloud Native Function (CNF) container, an event driven serverless architecture interface, and/or another type of SDN component. The common shared physical infrastructure may be implemented using one or more devices 400 described below with reference to FIG. 4 in a cloud computing center associated with private core network 150. Additionally, or alternatively, some, or all, of the shared physical infrastructure may be implemented using one or more devices 400 implemented in MEC device 145 in MEC network 140.

PDNs 160-A to 160-Y may each include a PDN. A particular PDN 160 may be associated with a Data Network Name (DNN) in 5G, and/or an Access Point Name (APN) in 4G, and a UE device may request a connection to PDN 160 using the DNN or APN. PDN 160 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

PDN 160 may include an orchestration device 170 (shown in PDN 160-A in FIG. 1 for illustrative purposes). Orchestration device 170 may be configured to orchestrate network slicing rules in a network device included in private core network 150. For example, an administrator may select a set of network slices and applications that are to be assigned to particular ones of the network slices. Orchestration device 170 may then provide a set of network slicing rules to one or more network devices in private RAN 130 and/or private core network 150 to perform application-level network slicing based on the network slicing rules.

PDN 160 may include an application server 180 (shown in PDN 160-Y in FIG. 1 for illustrative purposes). Application server 180 may provide services for an application running on UE device 110 and may establish an application session with UE device 10 via private RAN 130 and private core network 150. One or more network devices in private RAN 130 and/or private core network 150 may detect the application session and assign the application session to a network slice based on a network slicing rule.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
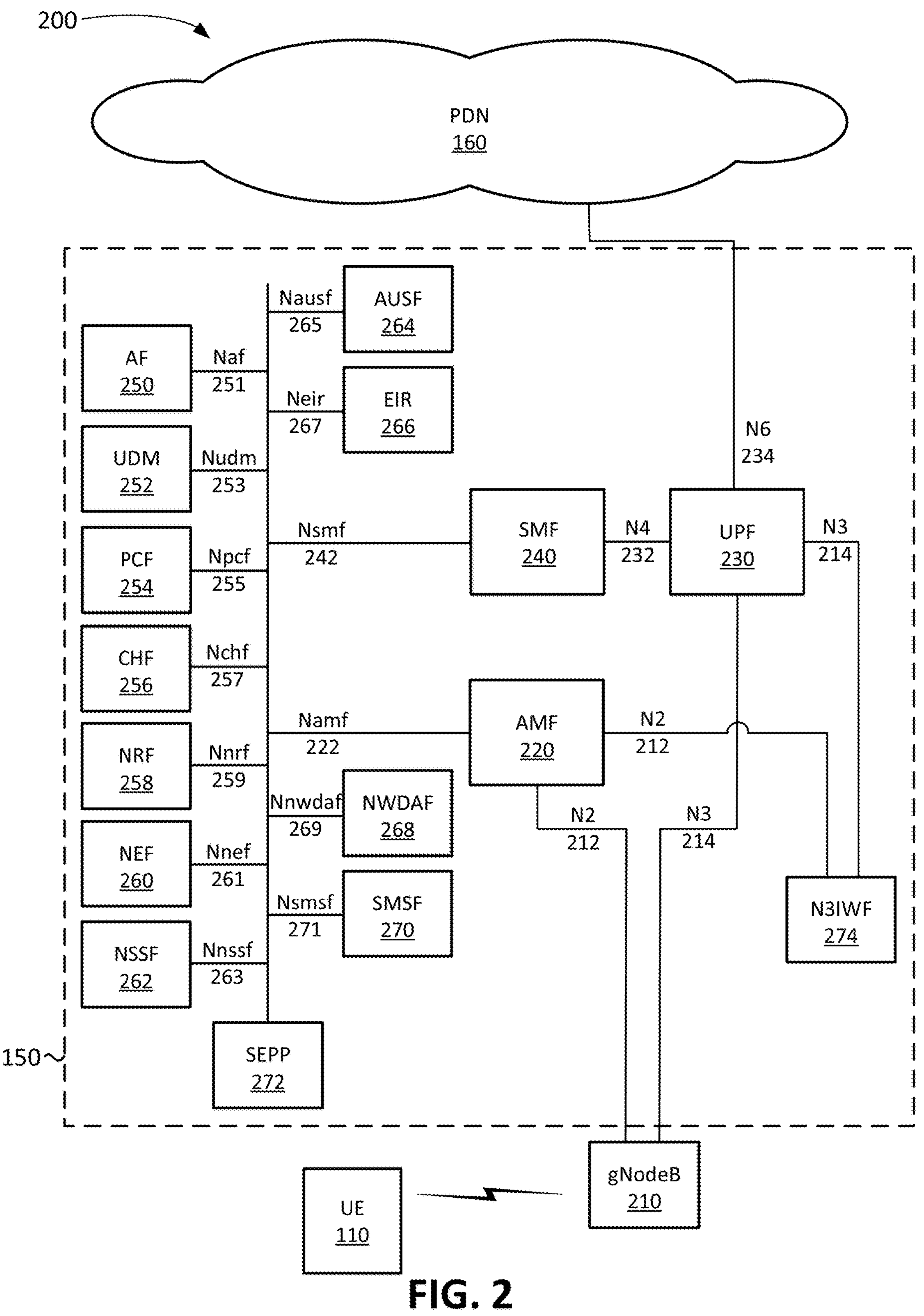
FIG. 2 is a diagram illustrating exemplary components of a Fifth Generation (5G) core network according to an implementation described herein.

FIG. 2 illustrates a system 200 that includes exemplary components of private core network 150 in the context of environment 100 according to an implementation described herein. As shown in FIG. 2, system 200 may include UE device 110, gNodeB 210, private core network 150, and PDN 160.

gNodeB 210 (corresponding to base station 120) may include devices (e.g., base stations) and components that enable UE device 110 to connect to private core network 150 via private RAN 130 using 5G NR RAT. For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214. In some implementations, gNodeB 210 may receive one or more network slicing rules that assign applications to network slices and apply the one or more network slicing rules to communication sessions.

Core network 150 may include an Access and Mobility Function (AMF) 220, a User Plane Function (UPF) 230, a Session Management Function (SMF) 240, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, private core network 150 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, Short Message Service (SMS) transport between UE device 110 and SMSF 270, session management messages transport between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU)

point of interconnect to a particular data network (e.g., PDN 160), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNodeB 210), and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data. SMF 240 may be accessible via an Nsmf interface 242. SMF may receive one or more network slicing rules that assign applications to network slices and may configure UPF 230 to implement the one or more network slicing rules.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface. In some implementations, AF 250 may correspond to, or interface with orchestration device 170 and/or application server 180.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. CHF 256 may perform charging and/or billing functions for private core network 150. For example, CHF 256 may generate a charging record for UE device 110 based on data flow information associated with UE device 110. CHF 256 may be accessible via Nchf interface 257.

NRF 258 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. NRF 258 may be accessible via an Nnrf interface 259.

NEF 260 may expose capabilities and events to other NFs, including 3rd party NFs, AFs, edge computing NFs, and/or other types of NFs. Furthermore, NEF 260 may secure provisioning of information from external applications to private core network 150, translate information between private core network 150 and devices/networks external to private core network 150, support a Packet Flow Description (PFD) function, and/or perform other types of network exposure functions. NEF 260 may be accessible via Nnef interface 261. In some implementations, orchestration device 170 may interact with SMF 240 and/or gNodeB 210 via NEF 260 by, for example, providing one or more slicing rules to SMF 240 and/or gNodeB 210 via NEF 260.

NSSF 262 may select a set of network slice instances to serve a particular UE device 110, determine network slice selection assistance information (NSSAI) or a Single-NSSAI (S-NSSA), determine a particular AMF 220 to serve a particular UE device 110, and/or perform other types of processing associated with network slice selection or management. NSSF 262 may be accessible via Nnssf interface 263. In some implementations, SMF 240 and/or gNodeB 210 may provide network slice selection information, which may be determined based on a detected application, for a communication session, and a query to NSSF 262. NSSF 262 may select a network slice for the communication session based on the received information provided in the query.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to determine if a PEI has been blacklisted. EIR 266 may be accessible via Neir interface 267.

NWDAF 268 may collect analytics information associated with radio access network 120 and/or private core network 150. For example, NWDAF 268 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between RAN 130 and the non-3GPP access device. N3IWF 274 maybe accessible via Nn3iwf interface 275.

Although FIG. 2 shows exemplary components of private core network 150, in other implementations, private core network 150 may include fewer components, different components, differently arranged components, or additional components than depicted in FIG. 2. Additionally, or alternatively, one or more components of private core network 150 may perform functions described as being performed by one or more other components of private core network 150. For example, private core network 150 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, private core network 150 may include a reference point architecture that includes point-to-point interfaces between particular function nodes.

Figure 3:
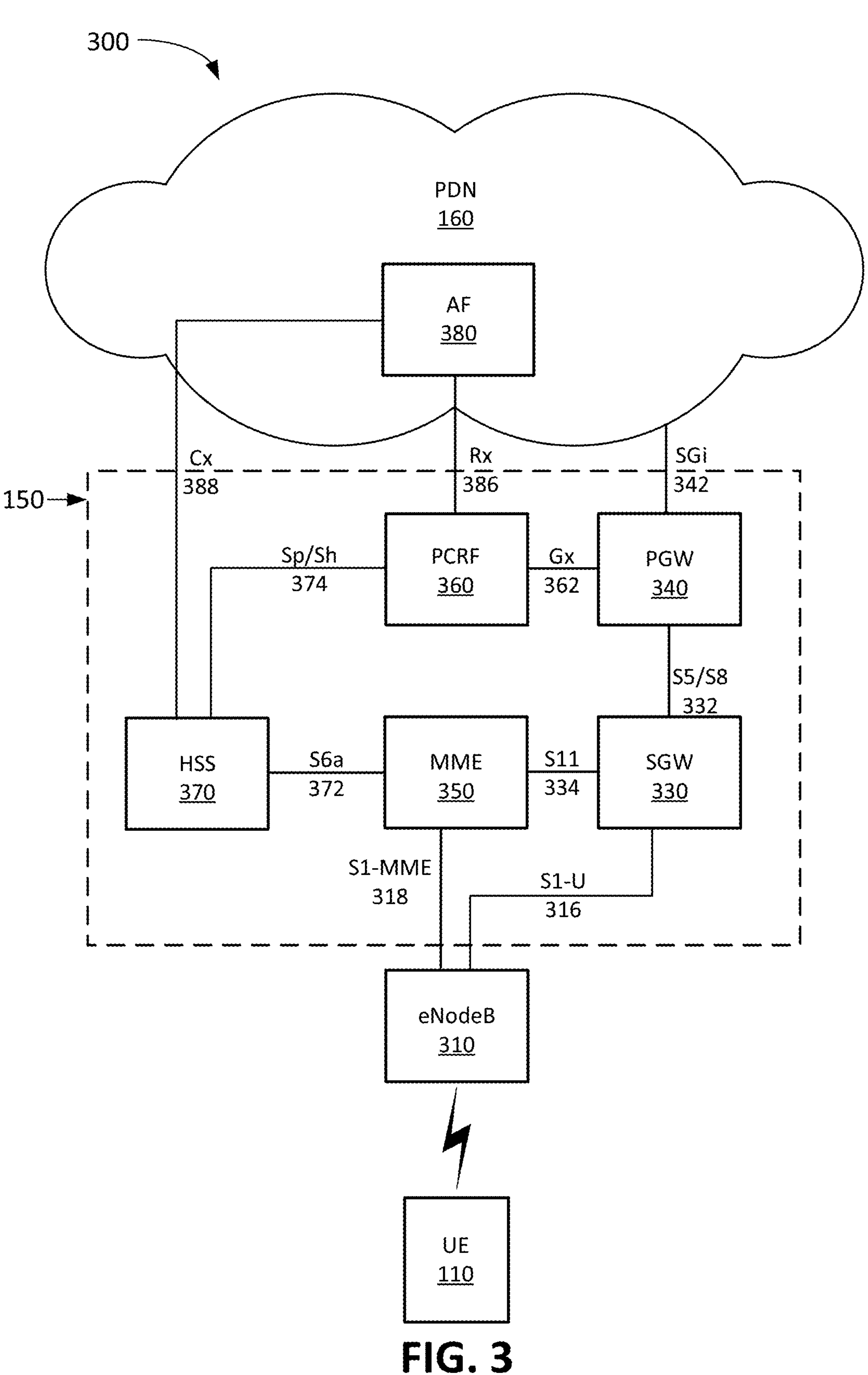
FIG. 3 is a diagram illustrating exemplary components of a Fourth Generation (4G) core network according to an implementation described herein.

FIG. 3 illustrates a system 300 that includes exemplary components of private core network 150 that includes a 4G LTE core network according to an implementation described herein. As shown in FIG. 3, system 300 may include UE device 110, eNodeB 310, private core network 150, and PDN 160. eNodeB 310 may correspond to, or be included in, base station 120. eNodeB 310 may communicate with UE device 110 using a 4G LTE air interface referred to as an Evolved Universal Mobile Telecommunications System (UMTS) Terrestrial Radio Access Network (E-UTRA) interface 312.

As shown in FIG. 3, private core network 150 may include a Serving Gateway (SGW) 330, a Packet Data Network (PDN) Gateway (PGW) 340, a Mobility Management Entity (MME) 350, a Policy and Charging Rules Function (PCRF) 360, and a Home Subscriber Server (HSS) 370. While FIG. 3 depicts a single eNodeB 310, a single SGW 330, a single PGW 340, a single MME 350, a single PCRF 360, and a single HSS 370 for illustration purposes, in practice, system 300 may include multiple eNodeBs 310, multiple SGWs 330, multiple PGWs 340, multiple MMEs 350, multiple PCRFs 360, and/or multiple HSSs 370.

eNodeB 310 may interface with private core network 150 via an interface referred to as an SI interface, which may include both a control plane S1-MME interface 318 and a data plane S1-U interface 316. S1-MME interface 318 may interface with MME 350. S1-MME interface 318 may be implemented, for example, with a protocol stack that includes a NAS protocol and/or Stream Control Transmission Protocol (SCTP). An S1-U interface 316 may interface with SGW 330 and may be implemented, for example, using General Packet Radio Service (GPRS) Tunneling Protocol version 2 (GTPv2). In some implementations, eNodeB 310 may receive one or more network slicing rules that assign applications to network slices and apply the one or more network slicing rules to communication sessions by assigning communication sessions to a particular QCI.

SGW 330 may provide an access point to and from UE device 110, may handle forwarding of data packets for UE device 110, and may act as a local anchor point during handover procedures between different eNodeBs 310. SGW 330 may interface with PGW 340 through an S5/S8 interface 332. S5/S8 interface 332 may be implemented, for example, using GTPv2. PGW 340 may function as a gateway to IP network 301 through an SGi interface 342. A particular UE device 110, while connected to a single SGW 330, may be connected to multiple PGWs 340, one for each data network (e.g., PDN 160) with which UE device 110 communicates. For example, a particular PGW 340 may be associated with a particular APN and UE device 110 may connect to the particular APN by connecting to the PGW 340 associated with the particular APN. Thus, UE device 110 may be connected to one or more APNs at a particular time. In some implementations, PGW 340 may receive one or more network slicing rules that assign applications to network slices and apply the one or more network slicing rules to communication sessions by assigning the communication sessions to a particular QCI.

MME 350 may implement control plane processing for private core network 150. For example, MME 350 may manage the mobility of UE device 110, implement tracking and paging procedures for UE device 110, activate and deactivate bearers for UE device 110, authenticate a user of UE device 110, and/or interface to non-LTE radio access networks. A bearer may represent a logical channel with particular QoS requirements. MME 350 may also select a particular SGW 330 for a particular UE device 110.

MME 350 may communicate with SGW 330 through an S11 interface 334. S11 interface 334 may be implemented, for example, using GTPv2. S11 interface 334 may be used to create and manage a new session for a particular UE device 110. S11 interface 334 may be activated when MME 350 needs to communicate with SGW 330, such as when the particular UE device 110 attaches to private core network 150, when bearers need to be added or modified for an existing session for the particular UE device 110, when a connection to a new PGW 340 needs to be created, or during a handover procedure (e.g., when the particular UE device 110 needs to switch to a different SGW 330).

PCRF 360 may implement policy and charging rules functions, such as establishing QoS requirements, setting allowed bandwidth and/or data throughput limits for particular bearers and/or UE devices 110, determining charges for a particular service for a UE device 110, and/or other types of policy or charging rules. PCRF 360 may communicate with PGW 340 through a Gx interface 362. Gx interface 362 may be implemented, for example, using Diameter protocol.

HSS 370 may store subscription information associated with UE devices 110 and/or information associated with users of UE devices 110. For example, HSS 370 may store subscription profiles that include authentication, access, and/or authorization information. Each subscription profile may include information identifying UE device 110, authentication and/or authorization information for UE device 110, services enabled and/or authorized for UE device 110, device group membership information for UE device 110, and/or other types of information associated with UE device 110. HSS 370 may communicate with MME 350 through an S6a interface 372. S6a interface 372 may be implemented, for example, using a Diameter protocol. HSS 370 may communicate with PCRF device 360 using an Sp/Sh interface 374. AF 380 may provide an enterprise policy to PCRF 360. AF 380 may communicate with PCRF 360 through an Rx interface 386 and may communicate with HSS 350 through a Cx interface 388. Rx interface 386 and Cx interface 388 may be implemented, for example, using Diameter protocol.

Although FIG. 3 shows exemplary components of private core network 150, in other implementations, private core network 150 may include fewer components, different components, differently arranged components, or additional components than depicted in FIG. 3. Additionally, or alternatively, one or more components of private core network 150 may perform functions described as being performed by one or more other components of private core network 150.

Figure 4:
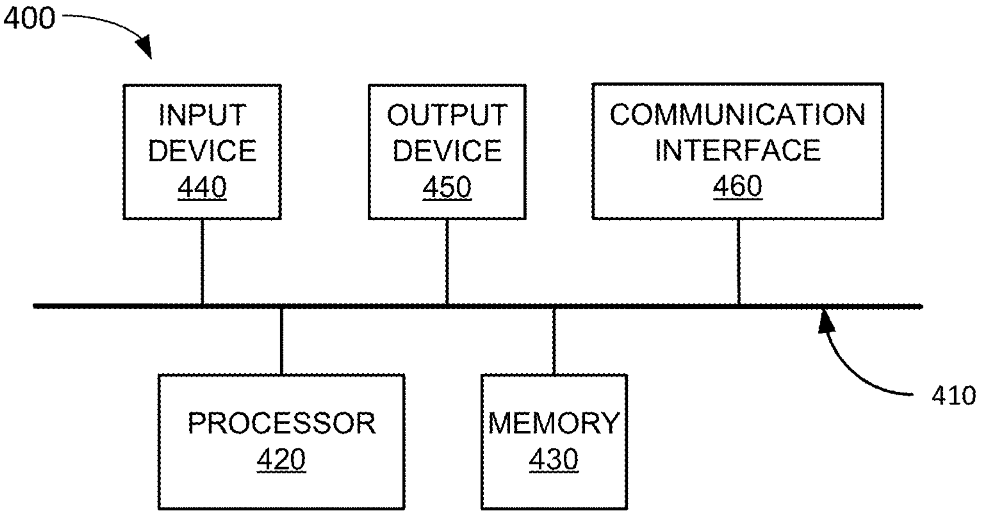
FIG. 4 is a diagram illustrating exemplary components of a device that may be included in a component of an environment according to an implementation described herein.

FIG. 4 illustrates example components of a device 400 according to an implementation described herein. UE device 110, MEC device 145, orchestration device 170, application server 180, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, eNodeB 310, SGW 330, PGW 340, MME 350, PCRF device 360, HSS 370, AF 380, and/or other components of private core network 150, may each include one or more devices 400. As shown in FIG. 4, device 400 may include a bus 410, a processor 420, a memory 430, an input device 440, an output device 450, and a communication interface 460.

Bus 410 may include a path that permits communication among the components of device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 440 may allow an operator to input information into device 400. Input device 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input device 440. In other words, device 400 may be "headless" and may not include a keyboard, for example.

Output device 450 may output information to an operator of device 400. Output device 450 may include a display, a printer, a speaker, and/or another type of output device. For example, device 400 may include a display, which may include a liquid-crystal display (LCD) for displaying content to the customer. In some embodiments, device 400 may be managed remotely and may not include output device 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to RF signals and/or a receiver that converts RF signals to baseband signals. Communication interface 460 may be coupled to one or more antennas/antenna arrays for transmitting and receiving RF signals.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 400 may perform certain operations relating to application-level network slicing. Device 400 may perform these operations in response to processor 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than depicted in FIG. 4. Additionally, or alternatively, one or more components of device 400 may perform one or more tasks described as being performed by one or more other components of device 400.

Figure 5:
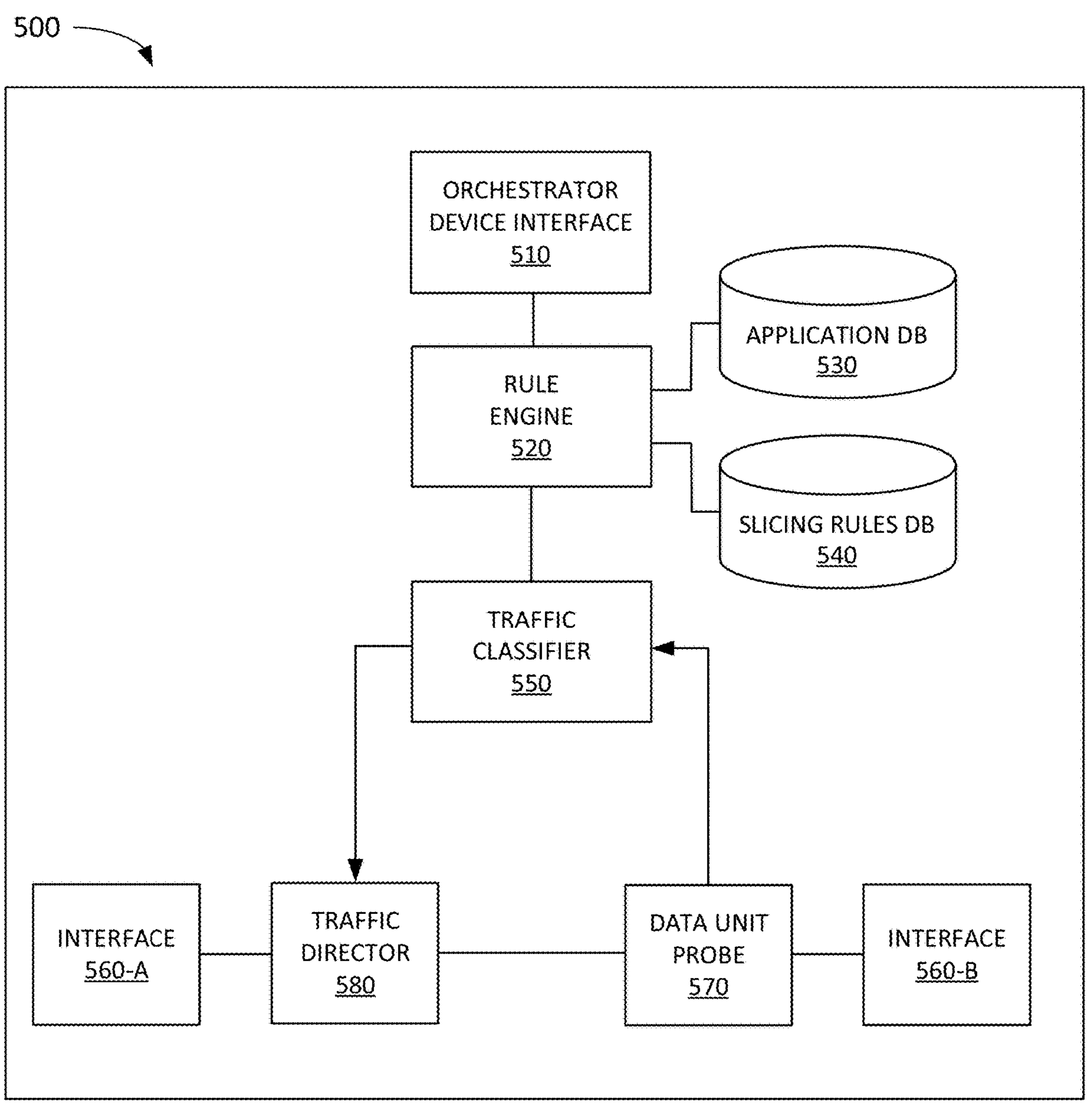
FIG. 5 is a diagram illustrating exemplary components of network devices configured to perform application-level network slicing according to an implementation described herein.

FIG. 5 is a diagram illustrating exemplary components of a device 500 that may be included in private core network 150 or private RAN 130, such as, for example, gNodeB 210, UPF 230, SMF 240, eNodeB 310, SGW 330, PGW 340, and/or another component of private RAN 130 or private core network 150. The components of system 500 may be implemented, for example, via processor 420 executing instructions from memory 430. Alternatively, some or all of the components of system 500 may be implemented via hard-wired circuitry. As shown in FIG. 5, device 500 may include an orchestrator device interface 510, a rule engine 520, an application database (DB) 530, a slicing rules DB 540, a traffic classifier 550, interfaces 560-A and 560-B, a data unit probe 570, and a traffic director 580.

Orchestrator device interface 510 may be configured to communicate with orchestrator device 170. For example, orchestrator device interface 510 may be configured to receive a set of network slicing rules, and/or information relating to applications, from orchestrator device 170. Rule engine 520 may be configured to receive the information from orchestrator device interface 510 and store the information in application DB 530 and/or slicing rules DB 540.

Application DB 530 may store information relating to particular applications. Exemplary information that may be stored in application DB 530 is described below with reference to FIG. 6A. Slicing rules DB 540 may store information relating to one or more slicing rules associated with private core network 150. Exemplary information that may be stored in slicing rules DB 540 is described below with reference to FIG. 6B.

In some implementations, rule engine 520 may include a data unit pattern analysis module that identifies and/or analyzes data unit patterns for particular applications and stores identified data unit patterns in application DB 530. For example, the data unit pattern analysis module may include a machine learning model trained to identify a data unit pattern for an application. The machine learning model may output, for example, a ratio of uplink data units to downlink data units for an application; a minimum, average, and/or maximum payload size for uplink data units and/or downlink data units associated with the application; a payload size variation for data units associated with the application; a minimum, average, and/or maximum throughput values associated with the application; and/or other types of data unit patterns for the application. The data unit patterns may be determined when data units can be unambiguously identified as being associated with the application (e.g., when the application traffic is not encrypted, when the application is assigned a particular VLAN ID, IP address and port, device group ID, etc.) and then may be used to identify the application when other techniques to identify the application are not available.

Traffic classifier 550 may obtain information relating to data units associated with a communication session from data unit probe 570, determine a classification (e.g., a network slice, a CoS class, etc.) for the data units based on information maintained by rule engine 520 and provide the classification result to traffic director 580. For example, a packet p from data flow i may include a VLAN ID 512. Traffic classifier 550 may mark data flow i as a video flow for video associated with a particular video application (based on the VLAN ID) and generate the following classification result: <flow: i, AppType: video, QCI: 6> to provide to traffic director 580. The flow ID i may be, for example, a hash value of the tuple <UE IP address, UE application port, Application Server IP address, Application Server Port, Protocol> and uplink and downlink streams for the communication sessions may be associated with the same tuple.

Traffic classifier 550 may include an application detector that detects whether data units associated with a communication session are associated with an application and/or identifies an application type or a specific application for the communication session. The application detector may detect and/or identify an application based on a static rule assignment of the application to a VLAN ID, IP address and port, and/or device group ID. Furthermore, the application detector may detect and/or identify an application based on a data unit pattern associated with the application. Data unit patterns associated with applications may be stored in application DB 530 and may be manually determined by an administrator or analyst and received via orchestration device 170. Additionally, or alternatively, the data unit patterns may be determined automatically by analyzing data traffic associated with particular applications and using a trained machine learning model to identify data unit patterns associated with particular applications, as described above.

Interfaces 560 may interface with other devices. For example, for uplink traffic, interface 560-A may receive data units originating from UE device 110 or a previous hop uplink device along the communication path from UE device 110, and interface 560-B may provide the uplink data units to a next hop destination along the communication path to the destination address. Similarly, for downlink traffic, interface 560-B may receive data units from a source device (e.g., application server 180) or a previous hop downlink device along the communication path from the source device and interface 560-A may provide the downlink data units to a next hop destination along the communication path to the destination address. Data unit probe 570 may mirror data units from the data flow and provide the mirrored data units to traffic classifier 550 for classification. Data unit probe 570 may be configured to mirror data units only from communication sessions that have not yet been classified.

Traffic director 580 may correspond to a kernel module on the data plane that marks data flows with a classification determined by traffic classifier 550 and/or routes data flows to a different destination based on the classification. For example, traffic director 580 may assign any downlink packets (e.g., from a LAN associated with private core network 150 to private RAN 130) in flow i with QCI 6 based on the above example of the classification <flow: i, AppType: video, QCI: 6>. Thus, traffic director 580 may assign a CoS class to a communication session based on the classification. As another example, traffic director 580 may route the data units for the communication session to a different logical device associated with a particular network slice and/or to a different physical device. For example, traffic director 580 may assign a network slice ID to the communication session and/or direct NSSF 262 to transfer the communication session to the assigned network slice. As another example, a slicing rule may direct data traffic associated with a particular application to MEC device 145 and the communication session may be transferred from a session between UE device 110 and application server 180 to a session between UE device 110 and MEC device 145.

Although FIG. 5 shows exemplary components of device 500, in other implementations, device 500 may include fewer components, different components, additional components, or differently arranged components than depicted in FIG. 5. Additionally, or alternatively, one or more components of device 500 may perform one or more tasks described as being performed by one or more other components of device 500.

Figure 6A:
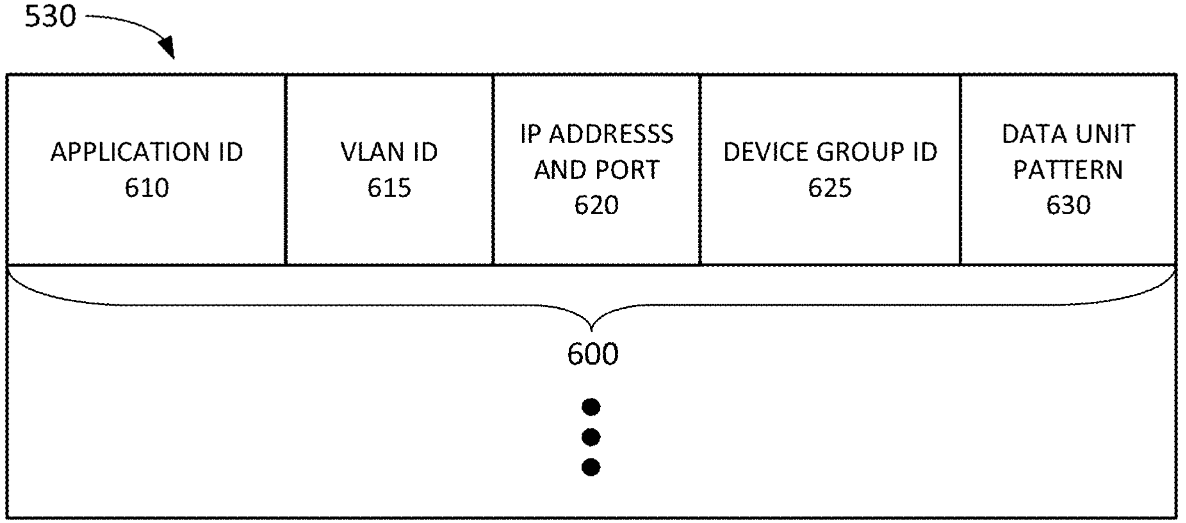
FIG. 6A is a diagram of exemplary components of an application database according to an implementation described herein.

FIG. 6A illustrates exemplary components of application DB 530 according to an implementation described herein. As shown in FIG. 6A, application DB 530 may include application records 600. Each application record 600 may store information relating to a particular application. Application record 600 may include an application identifier (ID) field 610, a VLAN ID field 615, an IP address and port field 620, a device group ID field 625, and a data unit pattern field 630.

Application ID field 610 may store an ID associated with an application. VLAN ID field 615 may store a VLAN ID associated with the application. IP address and port field 620 may store an IP address and port associated with the application. Device group ID field 625 may store a device group ID for a device group associated with the application.

Data unit pattern field 630 may store one or more data patterns associated with the application. A data unit pattern may be associated with an application type (e.g., video, etc.) or with a particular application (e.g., a video application associated with a particular streaming platform, such as Netflix®, Youtube®, etc.). A data unit pattern may include, for example, information specifying a ratio of uplink data units to downlink data units, one or more payload size threshold values for a payload size for uplink data units and/or a payload size for downlink data units, one or more throughput threshold values for throughput associated with data units, a count threshold for the number of data units within a particular time period, a payload size variation range for the payload size values associated with data units, and/or another type of data unit pattern.

Although FIG. 6A shows exemplary components of application DB 630, in other implementations, application DB 630 may include fewer components, different components, additional components, or differently arranged components than depicted in FIG. 6A.

Figure 6B:
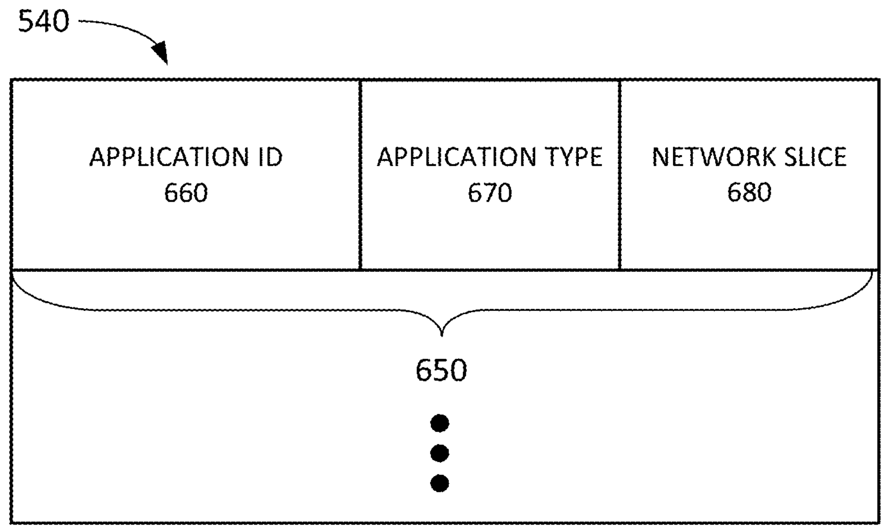
FIG. 6B is a diagram of exemplary components of a slicing rules database according to an implementation described herein.

FIG. 6B illustrates exemplary components of slicing rules DB 540 according to an implementation described herein. As shown in FIG. 6B, slicing rules DB 540 may include application records 650. Each application record 650 may store network slicing information relating to a particular application. Application record 650 may include an application ID field 660, an application type field 670, and a network slice field 680.

Application ID field 660 may store an ID associated with an application. Application type field 670 may store information identifying an application type associated with the application. Network slice field 680 may store network slice information and/or CoS information to which the application has been assigned. For example, network slice field 680 may store a network slice ID (e.g., S-NSSAI, etc.), an ID associated with a logical network, device, and/or path in private RAN 130 and/or private core network 150, a CoS ID associated with a particular CoS guaranteed by private RAN 130 and/or private core network 150, a priority value managed by private RAN 130 and/or private core network 150, and/or other types of information that may be used by private RAN 130 and/or private core network 150 to select a network slice or provide a particular CoS.

Although FIG. 6B shows exemplary components of slicing rules DB 540, in other implementations, slicing rules DB 540 may include fewer components, different components, additional components, or differently arranged components than depicted in FIG. 6B.

Figure 7:
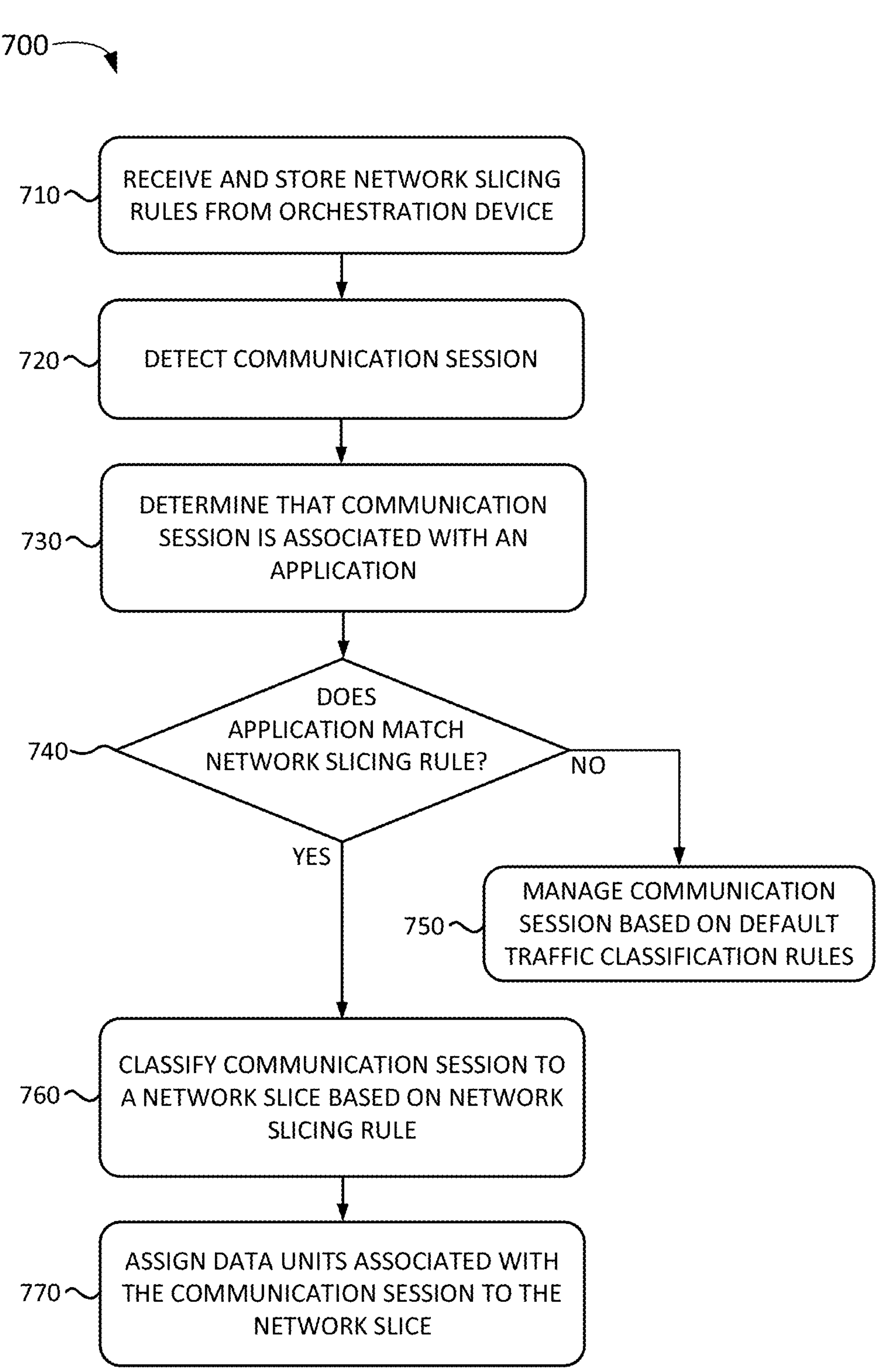
FIG. 7 illustrates a flowchart for performing application-level network slicing according to an implementation described herein.

FIG. 7 illustrates a flowchart 700 for performing application-level network slicing according to an implementation described herein. In some implementations, process 700 of FIG. 7 may be performed by gNodeB 210, UPF 230, SMF 240, eNodeB 310, SGW 330, PGW 340, and/or another component of private RAN 130 or private core network 150. In other implementations, some or all of process 700 may be performed by another device or a group of devices.

As shown in FIG. 7, process 700 may include receiving and storing network slicing rules from an orchestration device (block 710). For example, device 500 in private RAN 130 and/or private core network 150 (e.g., gNodeB 210, UPF 230, SMF 240, eNodeB 310, SGW 330, PGW 340, etc.) may receive one or more network slicing rules for applications and store the received one or more network slicing rules in slicing rules DB 540. Process 700 may further include detecting a communication session (block 720) and determining that the communication session is associated with an application (block 730). For example, data unit probe 570 may mirror data units from the communication session to traffic classifier 550 and traffic classifier 550 may use the application detector to determine whether the data units are associated with an application. If the data units are not associated with an application, traffic classifier 550 may not need to perform a classification process on the communication session.

Process 700 may further include determining whether the application matches a network slicing rule (block 740). For example, the application detector may request that rule engine 520 access slicing rules DB 540 to determine whether the identified application is associated with a network slicing rule. If it is determined that the application does not match a network slicing rule (block 740-NO), the communication session may be managed based on default traffic classification rules (block 750). Thus, traffic classifier 550 may not apply an application-level network slicing or classification rule to the communication session.

If it is determined that the application does match a network slicing rule (block 740—YES), the communication session may be classified to a network slice based on the network slicing rule (block 760) and data units associated with the communication session may be assigned to the network slice (block 770). For example, traffic director 580 of device 500 may assign a CoS class (e.g., QCI, 5QI, etc.) to the communication session based on the classification, assign a network slice ID to the communication session and/or direct NSSF 262 to transfer the communication session to the assigned network slice, direct data traffic associated with a particular application to MEC device 145, and/or perform another type of action associated with classifying a communication session based on a network slicing rule.

Figure 8:
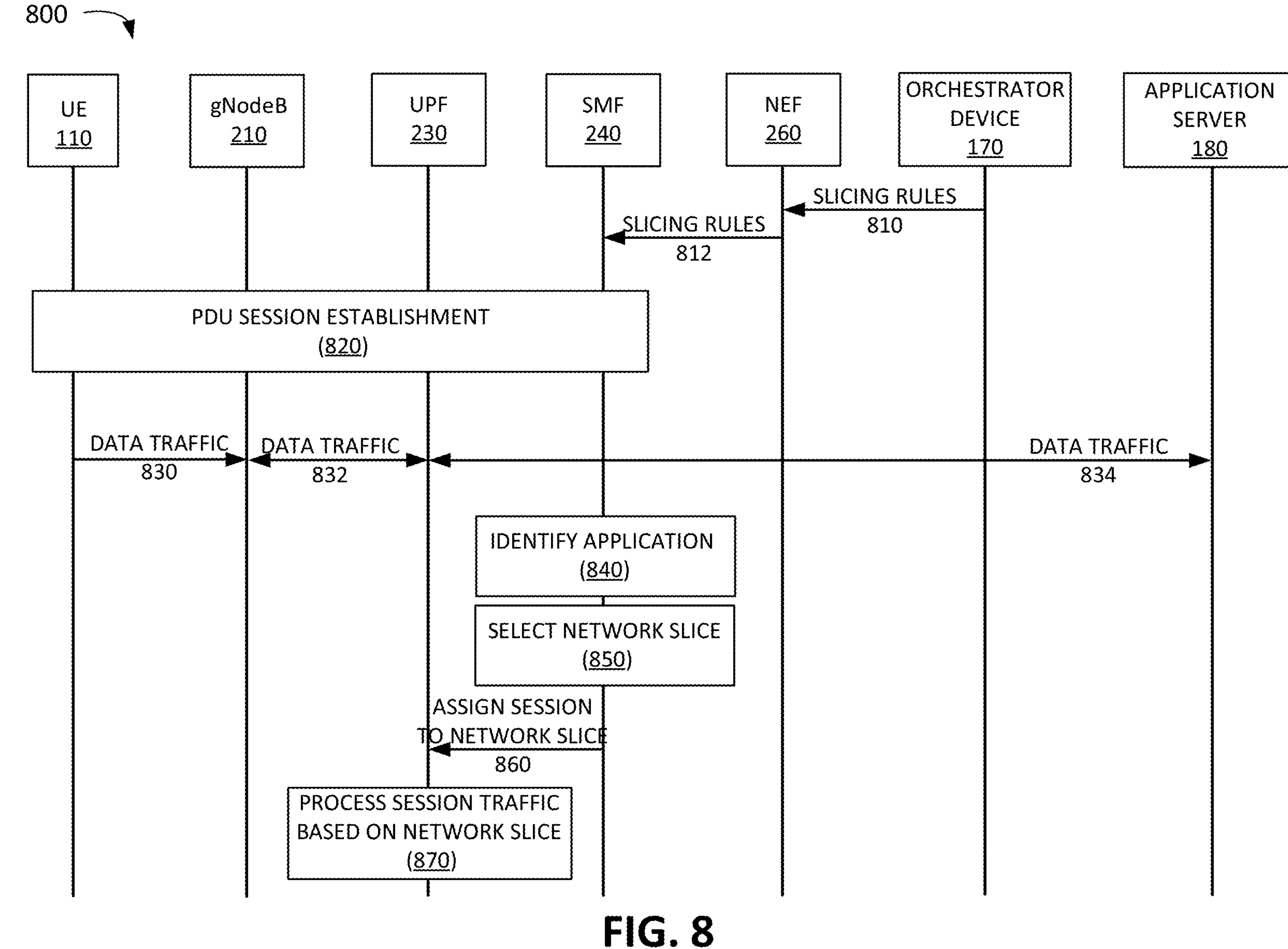
FIG. 8 illustrates an exemplary signal flow according to an implementation described herein.

FIG. 8 illustrates an exemplary signal flow 800 according to an implementation described herein. As shown in FIG. 8, signal flow 800 may include orchestration device 170 providing a set of network slicing rules in private core network 150 and/or private RAN 130 to SMF 240 via NEF 260 (signals 810 and 812). At a later time, UE device 110 may perform a Protocol Data Unit (PDU) session establishment procedure with SMF 240 and UPF 230 via gNodeB 210 (block 820) to communicate with application server 180. UE device 110 may begin to exchange data traffic with application server 180 via gNodeB 210 and UPF 230 using the established communication session (signals 830, 832, and 834).

In response, SMF 240 may identify the application associated with the communication session (block 840) and select a network slice for the communication session based on the identified application and a network slicing rule associated with the identified application (block 850). SMF 240 may then instruct UPF 230 to assign the communication session to the selected network slice (signal 860) and UPF 230 may then process session traffic based on the selected network slice (block 870).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals have been described with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:

determining, by a device, that data units associated with a communication session match a network slicing rule for a cellular wireless network;

classifying, by the device, the communication session to a network slice based on the network slicing rule; and assigning, by the device, the data units associated with the communication session to the network slice.

2. The method of claim 1, wherein the network slicing rule assigns different applications of a same application type to different network slices.

3. The method of claim 1, further comprising:

receiving the network slicing rule from an orchestration device, wherein the network slicing rule assigns a particular application to a particular network slice; and storing the network slicing rule in a database associated with a traffic classifier.

4. The method of claim 1, further comprising:

detecting that the data units associated with the communication session include a virtual local area network (VLAN) identifier, wherein the network slicing rule associates the VLAN identifier with an application;

detecting that the communication session in the cellular wireless network is associated with the application, in response to detecting that the data units associated with the communication session include the VLAN identifier; and wherein the assigning the data units associated with the communication session to the network slice is performed based on detecting that the communication session in the cellular wireless network is associated with the application.

5. The method of claim 1, further comprising:

detecting that the communication session is associated with an Internet Protocol (IP) address and port number, wherein the network slicing rule associates the IP address and port number with an application;

detecting that the communication session in the cellular wireless network is associated with the application, in response to detecting that the communication session is associated with the IP address and port number; and wherein the assigning the data units associated with the communication session to the network slice is performed based on detecting that the communication session in the cellular wireless network is associated with the application.

6. The method of claim 1, further comprising:

detecting that the data units associated with the communication session include a device group identifier, wherein the network slicing rule associates the device group identifier with an application;

detecting that the communication session in the cellular wireless network is associated with the application, in response to detecting that the data units associated with the communication session include the device group identifier; and wherein the assigning the data units associated with the communication session to the network slice is performed based on detecting that the communication session in the cellular wireless network is associated with the application.

7. The method of claim 1, further comprising:

detecting that the data units associated with the communication session satisfy a data unit parameter criterion; and wherein the assigning the data units associated with the communication session to the network slice is performed based on detecting that the data units associated with the communication session in the cellular wireless network satisfy the data unit parameter criterion.

8. The method of claim 7, wherein detecting that the data units associated with the communication session satisfy the data unit parameter criterion includes at least one of:

determining that the data units associated with the communication session are associated with a pattern of one uplink data unit to multiple downlink data units, determining that a payload associated with uplink data units is greater than an uplink payload threshold, or determining that a cumulative payload associated with downlink data units is greater than a downlink payload threshold.

9. The method of claim 1, further comprising:

detecting that the data units associated with the communication session correspond to video data units; and wherein the assigning the data units associated with the communication session to the network slice is performed based on detecting that the data units associated with the communication session correspond to video data units.

10. The method of claim 9, wherein detecting that the data units associated with the communication session correspond to video data units includes at least one of:

determining that throughput associated with the data units is greater than a throughput threshold, determining that an average downlink payload associated with the data units is greater than a payload threshold, or determining that a data unit count associated with the data units is greater than a data unit count threshold.

11. The method of claim 1, wherein assigning the data units associated with the communication session to the network slice includes:

assigning the data units associated with the communication session to a particular class of service.

12. The method of claim 1, wherein the device includes:

a packet data network gateway (PGW), an eNodeB, a User Plane Function (UPF), or a gNodeB.

13. A device comprising:

a processor configured to:

determine that data units associated with a communication session match a network slicing rule for a cellular wireless network;

classify the communication session to a network slice based on the network slicing rule; and assign the data units associated with the communication session to the network slice.

14. The device of claim 13, wherein the network slicing rule assigns different applications of a same application type to different network slices.

15. The device of claim 13, wherein the processor is further configured to:

receive the network slicing rule from an orchestration device, wherein the network slicing rule assigns a particular application to a particular network slice; and store the network slicing rule in a database associated with a traffic classifier.

16. The device of claim 13, wherein the processor is further configured to:

detect that the data units associated with the communication session include a virtual local area network (VLAN) identifier, wherein the network slicing rule associates the VLAN identifier with an application;

detect that the communication session in the cellular wireless network is associated with the application, in response to detecting that the data units associated with the communication session include the VLAN identifier; and wherein, when assigning the data units associated with the communication session to the network slice, the processor is configured to perform the assigning based on detecting that the communication session in the cellular wireless network is associated with the application.

17. The device of claim 13, wherein the processor is configured to assign the data units associated with the communication session to the network slice based on at least one of:

determining that the data units associated with the communication session are associated with a pattern of one uplink data unit to multiple downlink data units, determining that a payload associated with uplink data units is greater than an uplink payload threshold, or determining that a cumulative payload associated with downlink data units is greater than a downlink payload threshold.

18. The device of claim 13, wherein the processor is configured to assign the data units associated with the communication session to the network slice based on determining that the data units associated with the communication session correspond to video data units.

19. The device of claim 13, wherein, when assigning the data units associated with the communication session to the network slice, the processor is further configured to:

assign the data units associated with the communication session to a particular class of service.

20. A non-transitory computer-readable memory device storing instructions executable on a processor, the non-transitory computer-readable memory device comprising:

one or more instructions to determine that data units associated with a communication session match a network slicing rule for a cellular wireless network;

one or more instructions to classify the communication session to a network slice based on the network slicing rule; and one or more instructions to assign the data units associated with the communication session to the network slice.

* * * * *